United States Patent [19]

Doherty et al.

[11] 4,011,732

[45] Mar. 15, 1977

[54] HEAT-STATIONED BAYONET CONNECTOR FOR CRYOGENIC FLUID LINES

[75] Inventors: Paul R. Doherty, Woburn; Robert W. Johnson, Holbrook, both of Mass.

[73] Assignee: Helix Technology Incorporated, Waltham, Mass.

[22] Filed: Feb. 14, 1974

[21] Appl. No.: 442,326

[52] U.S. Cl. .................................... 62/55; 285/41; 285/47; 285/133 R; 285/DIG. 5

[51] Int. Cl.[2] .......................................... F17C 7/02

[58] Field of Search ............ 62/45, 55; 285/41, 47, 285/133 R, 138, DIG. 5

[56] References Cited

UNITED STATES PATENTS

| | | | |
|---|---|---|---|
| 3,207,533 | 9/1965 | Van Gundy et al. | 285/47 X |
| 3,275,345 | 9/1966 | Waldron et al. | 285/47 |
| 3,304,729 | 2/1967 | Chandler et al. | 62/45 |
| 3,371,946 | 5/1968 | Bleyle, Jr. et al. | 285/47 |
| 3,775,989 | 12/1973 | Mursinna et al. | 62/55 |

*Primary Examiner*—William F. O'Dea
*Assistant Examiner*—Ronald C. Capossela
*Attorney, Agent, or Firm*—Griffin, Branigan and Butler

[57] ABSTRACT

A heat-stationed bayonet connector suitable for connecting liquid cryogen sources and refrigeration loads to a cryogenic fluid transfer line or for connecting components such as flexible sections, etc., into the transfer line. The incorporation of a cold heat station in the bayonet connector and its thermal connection to a coolant makes it possible to intercept heat flow along the length of the bayonet and thereby to minimize heat losses associated with the connector. The use of a cryogenic coolant transfer line in the form of a flexible bypass connecting the male and female sections of the bayonet makes it possible to use the bayonet connector in a transfer line which incorporates a cooled radiation shield along essentially its entire length.

23 Claims, 5 Drawing Figures

40 113 42 102 95 119 87 85 117 116 58 65 62 104 103 91 105 112 94 92 115 69 71 67 72 111 73 118 96 42 74 97 101 110 75 114 41 40

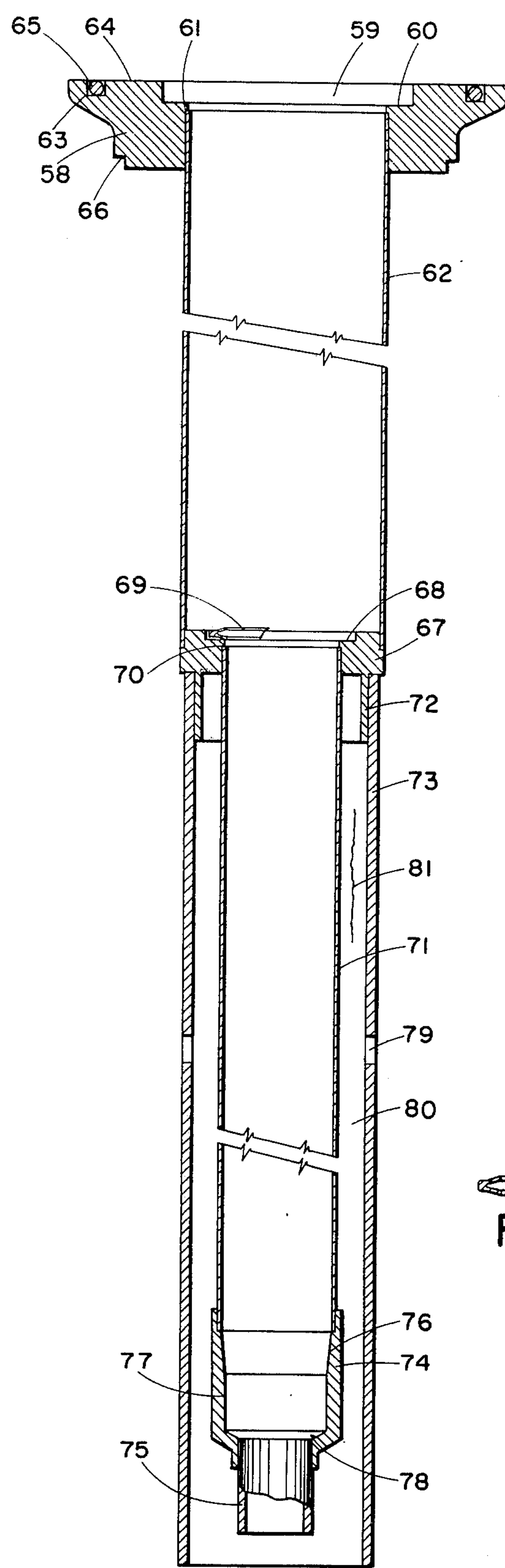
Fig. 1
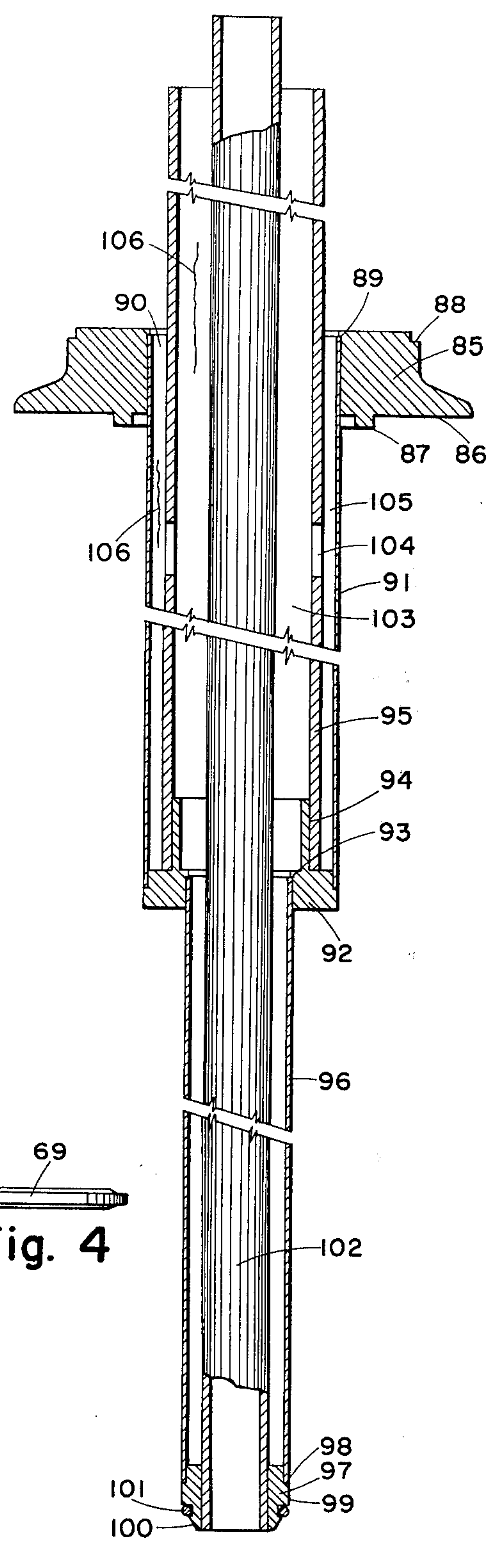
Fig. 2
69
Fig. 4

HEAT-STATIONED BAYONET CONNECTOR FOR CRYOGENIC FLUID LINES

This invention relates to the transfer of a cryogenic fluid between two points, e.g., a source of a liquid cryogen and a refrigeration load cooled by the liquid cryogen. More particularly, this invention relates to a low-loss bayonet connector for use in a helium transfer line carrying liquid helium and/or 4.2° K helium gas between a source and load over an extended distance with minimum loss.

The transfer of fluid helium (as a liquid or as 4.2° K gas) from a source (a liquefier or an insulated storage vessel to a refrigeration load and back to a reservoir presents few problems in those cases where the source and load are separated by only a few feet and where the transfer line and its connections with the source and load remain relatively fixed. Connections between transfer line sections, between the line and the source and load as well as between the line and such auxiliary equipment as valves and the like have always been made by so-called bayonet connectors which in turn have introduced relatively large heat leaks into the system. Moreover, the longer the transfer line and the more connections made, the greater all heat leaks become and they finally reach a level which makes the transfer of liquid helium impractical if not impossible. Although it has been customary to provide radiation shields for some sections of the prior art transfer lines and to cool these sections if desired, it has not been possible to provide a transfer line having cooled radiation shielding along essentially its entire length. One of the primary contributors to this inability to provide an essentially continuous, cooled radiation shielding on such prior art transfer lines was the structure of the bayonet connector which prevented its being adequately shielded and cooled. This in turn required large gaps in the coolant transfer line system which meant that an integrated radiation shielded coolant line could not be constructed.

With the advent of the use of liquid helium to cool industrial-sized equipment (superconducting magnets, superconducting transmission lines, superconducting loops for electrical storage, and the like) there arises the need for transferring large quantities of liquid helium and/or 4.2° K helium gas to provide the refrigeration required to maintain such equipment incorporating superconductors in their superconducting state. Since it is not always feasible to locate one or more helium liquefiers immediately adjacent the equipment which embodies the refrigeration load; and since it is desirable to be able to use one liquid helium source to supply refrigeration to more than one load either simultaneously or alternatively, or to use more than one liquid helium source in connection with single or multiple loads, it is necessary to be able to change transfer line connections without sacrificing the efficiency of the over-all line. This requires a very efficient helium transfer system which in turn requires very efficient connectors at the ends of the transfer line as well as within the line itself.

The refrigeration of a load such as a superconducting magnet must be accomplished by helium in the liquid state and/or as 4.2° K gas. Thus it is essential for efficient refrigeration of such a load to deliver as much as possible of the liquid helium from the source to the load in the liquid state, a requirement which in turn demands minimizing heat leaks along the entire transfer line into the process line carrying the liquid helium. Since the latent heat of vaporization of liquid helium is extremely low (82.46 joules per mole at 4.2° K) the need for minimum heat loss is immediately apparent. Although refrigeration is accomplished by the use of liquid helium and/or 4.2° K helium gas, it will be convenient hereinafter to refer to this refrigerant as liquid helium, it being understood that the term includes 4.2° K gas as well.

Refrigeration on an industrial or large scale by use of liquid helium requires a relatively large input of energy to develop the liquid helium. Thus for example, some 1500–2000 Btu of power is required to develop one watt of refrigeration (using for example a large helium cryostat such as described in U.S. Pat. No. 2,458,894). It therefore becomes of paramount importance to maintain liquid helium losses at a minimum during transfer. The minimizing of transfer losses means that a smaller liquefier can be used to refrigerate a given load or that a liquefier of a given size can refrigerate a larger load.

The bayonet connector of this invention achieves minimum heat loss through the incorporation of cold heat station means and the use of a unique arrangement of radiation shielding means within the bayonet which makes it possible to continually cool the heat station means. This heat station means intercepts the flow of heat along the length of the bayonet and thereby minimizes the heat losses in the connector. The connector may be cooled by a cryogenic coolant such as liquid nitrogen ($LN_2$) circulating through an $LN_2$ bypass line which in turn may be directly connected to the main $LN_2$ transfer line carrying $LN_2$ coolant to cool the radiation shielding of a liquid helium transfer line. Alternately, cold helium gas may be used to cool the bayonet connector and radiation shielding. Hence, the bayonet connector of this invention makes it possible to use cooled radiation shielding throughout the entire length of a liquid helium transfer line and thus to reduce heat leaks not only along the bayonet itself but along an entire liquid helium line such as that disclosed in application Ser. No. 443,140 filed concurrently herewith in the names of Robert W. Johnson and Paul R. Doherty and assigned to the same assignee as this application now U.S. Pat. No. 3,945,215.

It is therefore a primary object of this invention to provide an improved bayonet connector for use with a fluid cryogen, e.g., liquid helium and/or 4.2° K helium gas, transfer line. It is another object of this invention to provide a bayonet connector of the character described which exhibits a relatively small temperature gradient along its length to the heat station and therefore causes a minimum heat leak within a system in which it is incorporated. It is still another object to provide such a bayonet connector which makes it possible to provide continuous cooling of radiation shielding of a transfer line with which the bayonet is used. Other objects of the invention will in part be obvious and will in part be apparent hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which FIG. 1 is a lengthwise cross sectional view of the female section of the heat-stationed bayonet connector of this invention;

FIG. 2 is a lengthwise cross sectional view of the male section of the heat-stationed bayonet connector of this invention;

FIG. 4 is a cross section of a thermal conducting ring used in joining the bayonet connector sections when only one section of the bayonet connector is cooled.

Bayonet connectors are known in the art. However, in these prior art connectors, each section is formed as one continuous tube extending continuously from a room temperature station down to the cold seal. This large temperature difference over a relatively short distance results in a conductive heat leak along the metallic tubes which in many applications is quite significant. The heat leak thus set up can be reduced, but not eliminated, by increasing the length of the bayonet. However, there are practical limitations on the bayonet's length, limitations which affect the efficiency of this type of connector when constructed according to the prior art teaching.

The heat-stationed bayonet of this invention is constructed so that it is possible to intercept the transfer of heat along the length of the assembled bayonet. This interception is effected along both the male and female sections by the inclusion of heat stations. The heat stations may be in thermal contact, if a thermal conducting ring is used, when the sections are engaged and thereby both male and female heat stations will be maintained at the required low temperature even though coolant is provided to one section only (either male or female). Alternatively, in the absence of any thermal connection between the heat stations of the two sections, each section may be separately cooled. The radiation shielding means in turn is cooled by liquid nitrogen (or other suitable cryogenic coolant) which may, if desired, be shunted around a portion of the heat-stationed bayonet through an $LN_2$ bypass.

Figure 5:
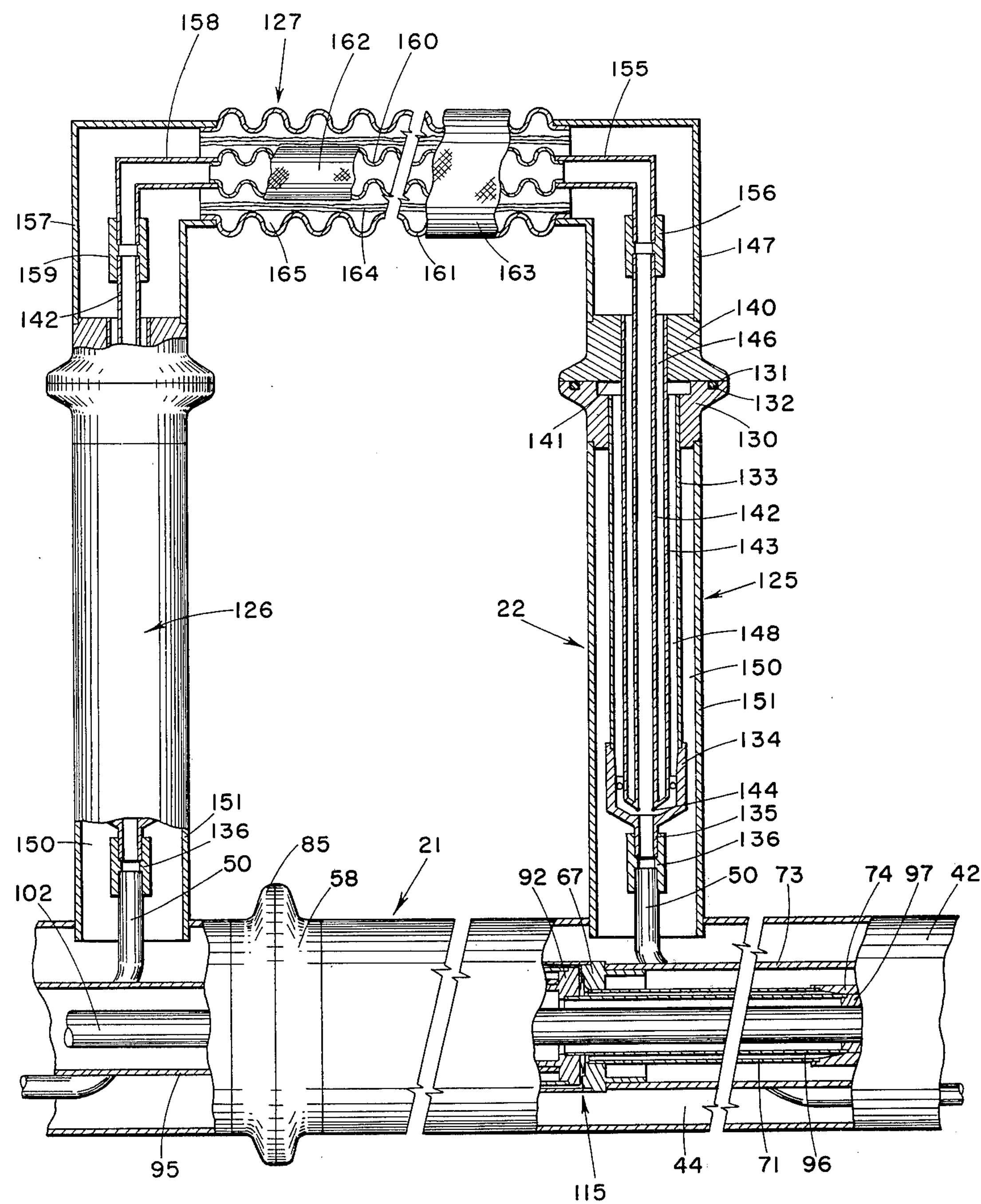
FIG. 5 is a cross sectional view of a liquid nitrogen bypass attached to the fully engaged heat-stationed bayonet connector showing another embodiment of a cooling means for the bayonet connector.

FIGS. 1–4 show the heat-stationed bayonet connector of this invention in detail; and FIG. 5 illustrates the use of an $LN_2$ bypass line as one embodiment of a cooling means for the heat-stationed bayonet connector.

FIG. 1 is a longitudinal cross section through the center of the female section of the bayonet connector. This section is formed of a mating flange 58 constructed to have a central passage 59 with an inwardly directed rim 60 terminating in a narrow lip 61 serving as a seat for thin-walled extension tube 62 formed of a low heat conductive material such as stainless steel. Tube 62 is sized and constructed to reduce the heat leak to the heat station. Flange 58 has an outer annular recess 63 in its mating surface 64 to seat an elastomeric sealing ring 65 and a peripheral shoulder 66 to seat a vacuum jacket (shown in FIG. 3). Tube 62 terminates in an annular heat station 67 configured to define a rim seat 68 to seat a compressible thermal conducting ring 69, shown in expanded form in cross sectional detail in FIG. 4. This thermal conducting ring comprises an annular ring with an angled cross section. Heat station 67 is also configured to provide an inwardly directed lip 70 adapted to seat an inner thin-walled, stainless steel extension tube 71, and a transition piece 72, in the form of a skirt, used to connect copper tubing 73, which serves as the radiation shielding associated with the female section, to heat station 67. Radiation shielding 73 extends for the remaining length of the bayonet connector and it is adapted for connection to the radiation shielding of a transfer line or of an apparatus to which the bayonet is connected.

Inner extension tube 71 ends within a mating seat 74 welded on one end to inner tube 71 and on the other end to a short tubing section 75 adapted to be coupled to the liquid helium process line. Internally, mating seat 74 (from its connection with tube 71 to its connection with tubing section 75) has a slightly decreasing-diameter section 76, a constant-diameter section 77 and a short sharply decreasing-diameter section 78. A series of ports 79 provide fluid communication between spacing 80 defined between tubes 71 and 73 so that when the volume around tube 73 is evacuated spacing 80 will also be evacuated. Multilayer insulation 81 is located in spacing 80, only a fragment being shown.

The male section of the heat-stationed bayonet connector is shown in FIG. 2. It will be seen to have a mating flange 85 with mating surface 86, adapted to engage surface 64 of the female section, and a shot annular ring extension 87 of this mating surface is adapted to fit snugly against the outer wall of the larger diameter section of central passage 60 of the female section. Flange 85 has a peripheral shoulder 88 adapted to seat a vacuum jacket. Seated onto lip 89, extending inwardly into flange central passage 90, is an outer, thin-walled stainless steel extension tube 91 which is connected to an annular heat station 92 configured to provide an internal lip 93 and a transition piece 94 in the form of a skirt. Radiation shielding 95 formed as a copper tube is bonded for thermal connection to transition piece 94, and this radiation shielding extends through tubing 91 and beyond mating flange 85. An inner, thin-walled stainless steel extension tube 96 extends from heat station 92 to an annular nose piece 97 shaped to have an external surface which defines a shoulder 98 for seating tube 96, a constant diameter section 99 and a decreasing diameter section 100, the latter having an annular groove cut in it to seat an elastomeric O-ring seal 101. A liquid process line 102, formed perferably of an austenitic stainless steel, extends from nose piece 97 through tube 96, and through and beyond radiation shield 95. The annular space 103 defined between the external wall of process line 102 and the internal wall of radiation shielding 95 is in fluid communication through a series of ports 104 with the annular space 105 defined between radiation shielding 95 and outer tubing 91. Both spaces 103 and 105 contain multilayer insulation 106 shown only fragmentarily. When a vacuum jacket is affixed to flange 85, both spaces 103 and 105 are evacuated.

Figure 3:
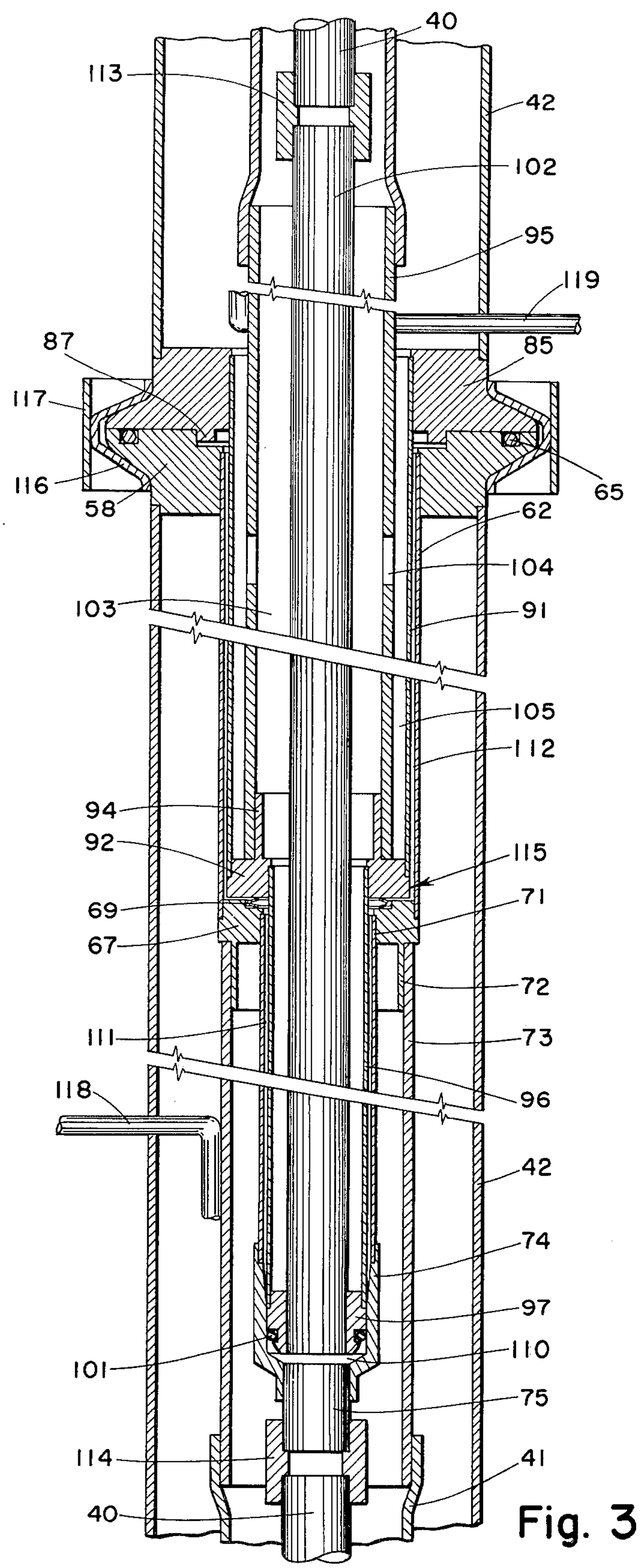
FIG. 3 is a lengthwise cross sectional view of the assembled bayonet connector with the sections fully engaged showing one embodiment of cooling means associated with the assembled bayonet.

In FIG. 3, in which the elements forming the female and male sections are identified by the same reference numerals used in FIGS. 1 and 2, the heat-stationed bayonet connector is shown in complete engagement. With the full insertion of the male section into the female section, mating surface 64 and 86 engage and O-ring seal 65 contacts surface 86 to form a fluid-tight seal. Heat station 67 of the female section makes indirect contact with heat station 92 of the male section through thermal conducting ring 69 which is compressed between the two heat stations.

This thermal conducting ring may be omitted in those cases where radiation shielding 73 associated with the female section and radiation shielding 95 associated with the male section are each cooled separately. In such cases, the indirect thermal contact between heat stations 67 and 92, through thermal conducting ring 69, is not necessary. However, in those cases where the radiation shielding of only one section (either male or female) of the bayonet connector is cooled directly through an $LN_2$ line or by other suitable means, then thermal conducting ring 69 is used so that the radiation shielding of the other section is cooled indirectly. For example, if the bayonet is used to make a connection between a transfer line and a refrigeration load and the radiation shielding of one section (e.g., female section) of the bayonet is thermally connected to a cooled radiation shielding associated with the load, then by using thermal conducting ring 69 between heat stations 67 and 92 it will be unnecessary to provide cooling for radiation shielding of the other section (e.g., male section).

When the sections are engaged as shown in FIG. 3, the O-ring seal 101 in nose piece 96 at the end of the male section forms a liquid-tight, cold seal with the internal wall of constant-diameter section 77 of mating seat 74 of the female section. It will be seen that so long as O-ring 101 engages the internal wall of constant-diameter section 77 of mating seat 74 a liquid-tight seal will be formed. This provides a degree of tolerance in the length of tube 96 relative to tube 71. The short tubing section 75 of the female section, serving as a portion of a liquid process line, is in fluid communication with the process line 102 of the male section through the small chamber 110 defined within the mating seat and limited by the line of engagement of the internal wall of mating seat 74 and O-ring 101.

One narrow annular space 111 is defined between tubes 96 and 71 and another annular space 112 is defined between tubes 91 and 62. These spaces are of sufficient width to make an easy slide fit between the respective tubes defining them, and space 111 must also provide for room to deform O-ring 101 to form the liquid-tight seal.

FIG. 3 also illustrates the incorporation of the heat-stationed bayonet connector of this invention into a typical liquid helium process line designated by the numeral 40. Thus the fluid process line 102 extending throughout the length of the male section of bayonet is coupled to a main liquid helium process line 40 by a union socket 113, typically formed of an austenitic stainless steel. The radiation shielding means 41 of a typical transfer line is shaped for making bonded connection over the end of radiation shield 95 of the male section. In a similar manner the short tubing section 75 of the female section is joined through union socket 114 to process line 40 and radiation shield 73 is joined to radiation shielding means 41. Sections of a vacuum jacketing 42 associated with a liquid helium transfer line are fit onto mating flanges 58 and 85 at peripheral shoulders 66 and 88, respectively.

The two sections of the bayonet connector are retained in their engaged position by means of a clamp member comprising a series of grippers 116 held by a circular band 117 which is tightened around the grippers by a nut and bolt (not shown).

As will be evident from FIGS. 1–3, the heat-stationed bayonet of this invention may be described as being formed, in addition to a process line, of radiation shielding means (comprising a first radiation shield 73 associated with the female section and a second radiation shield 95 associated with the male section) intersected by heat transfer means 115 (comprising heat stations 67 of the female section and 92 of the male section along with thermal connecting ring 69 if used) and a series of concentric thin-walled extension tubes of low heat conductivity (62, 71, 91 and 96) defining annular spacings on either side of the heat station means and providing, with minimum heat leak, the necessary structure to support the heat station means and the nose piece and its mating seat forming the liquid seal. The radiation shielding means is adapted for connection to the radiation shielding of a transfer line, of a line leading from a fluid cryogen source or of a transfer line component; and the process line is adapted for connection to a process line of a transfer line system and/or the process line of a cryogenic fluid source or of a refrigeration load.

As pointed out previously, the bayonet connector used in the transfer line of this invention is designed to intercept the flow of heat along its length by the use of heat station 67 of the female section and heat station 92 of the male section. As explained in the description of FIG. 3, these two heat stations may be in indirect thermal contact through thermal conducting ring 69 if it is used. The combined heat station means, designated by reference numeral 115, is also in thermal contact with radiation shield 73 through transition piece 72 and with radiation shield 95 through transition piece 94. By cooling radiation shields 73 and 95 through the use of liquid nitrogen circulating in the $LN_2$ coolant coils 118 and 119 bonded in thermal contact therewith, or by cooling one or the other of radiation shields 73 and 95 alone and incorporating thermal conducting ring 69, the heat station means 115 is cooled to essentially liquid nitrogen temperature, thus serving as an effective means for intercepting any heat leak along the length of the bayonet. As an alternative to the use of liquid nitrogen, cold helium gas may be used as a radiation shielding coolant. Thus the heat-stationed bayonet may be relatively short compared to prior art bayonets designed for minimum heat leak. It is, moreover, more efficient than prior art bayonets in that it reduces liquid helium losses to a level heretofore not attainable in connectors of this type. Finally, and very importantly, the heat-stationed bayonet connector is adapted for use in a transfer line which incorporates an $LN_2$-cooled radiation shield protecting essentially its entire length.

Since the bayonet is a connector and must be disengageable, it is not possible to use a single straight $LN_2$ coolant line along its entire length. FIG. 3 illustrates the use of separate $LN_2$ lines used for each of the bayonet sections. As previously explained, lines 118 and 119 may be used alternatively or in combination. However, when the heat-stationed bayonet is used in a transfer line in which the radiation shielding is to be cooled and a single $LN_2$ line system is required, a flexible $LN_2$ bypass line may be used in connection with each bayonet connector to join the $LN_2$ line bonded to the radiation shielding on each side of heat station means 115. Such a bypass line and its attachment to the bayonet are shown in FIG. 5.

As will be seen in FIG. 5, the $LN_2$ line 50 of a main liquid helium transfer line breaks contact with bayonet radiation shield 73 just short of heat station means 115 and rejoins bayonet radiation shield 95 just beyond mating flange 85 shown without the clamping member of FIG. 3. The $LN_2$ bypass connects the two ends of $LN_2$ line 50 at these points. The bypass is comprised of two bayonet connectors 125 and 126, constructed in accordance with the prior art teaching, and a flexible insulated section 127 between bayonets 125 and 126.

The construction of bayonet 125 is shown in FIG. 5. Bayonet 126 is an exact duplicate of 125 and need not be described. The female section of bayonet 125 is comprised of a mating flange 130 having a mating surface 131 which is grooved to seat an O-ring seal 132. Extending from the central opening of flange 130 is a tube 133 which terminates in a mating seat 134 having an $LN_2$ line extension 135 suitable for joining to $LN_2$ line 50 through a union socket 136. The male section of bayonet 125 comprises mating flange 140 with mating surface 141, and concentric inner tube 142 and outer tube 143 which are welded at the cold end at 144. Mating flanges 130 and 140 are maintained in engagement by a clamp (not shown) similar to the clamp shown in FIG. 3. Inner tube 142 which is the $LN_2$ transfer line extends beyond flange 140 for easy connection. Spacing 146 defined between tubes 142 and 143 is open at the warm end for communication with an evacuated volume defined within vacuum jacket 147 which is elbow shaped. Spacing 148 is defined between tubes 143 and 133 and serves as insulation; while spacing 150, which is defined between tube 133 and a vacuum jacket 151 extending from the female section mating flange 130 through the transfer line vacuum jacketing 42, is evacuated by virtue of its connection with the evacuated main transfer line.

$LN_2$ transfer line 142 of the bayonet is joined to an elbow section 155 of $LN_2$ transfer line through a union socket 156. Connected to bayonet 126 is an allochiral arrangement of the elements attached to bayonet 125 comprising elbow shaped vacuum jacket 157, an elbow section 158 of the $LN_2$ line, and coupling 159 joining the transfer line 142 of bayonet 126 to section 158. Between these two facing elbow sections is flexible section 127 comprising an inner bellows 160 joining $LN_2$ line sections 155 and 158, and outer bellows 161 joining vacuum jackets 147 and 157. Protective wire screenings 162 and 163 are placed around inner bellows 160 and outer bellows 161, respectively. Multilayer insulation 164, such as several layers of a crinkled aluminized plastic film formed of an ethylene glycol terephthalate polymer, is placed in the evacuated spacing 165 defined between bellows 160 and 161.

It will be seen from FIG. 5 that the evacuated spacing around the bayonet connector is not in fluid communication with the evacuated spaces defined within bayonets 125 and 126 and flexible connection 127. It is therefore necessary to provide separate means such as a seal-off valve and line to a vacuum pump (not shown) for evacuating the by-pass line. The female section of bayonet 125 is in effect connected to the female section of heat stationed bayonet 21; while the female section of bayonet 126 is connected to the male section of the heat-stationed bayonet. This connection makes it possible to provide the required refrigeration through the $LN_2$ line to the radiation shields and heat station means of the heat stationed bayonet. In such an arrangement it is not necessary to use a thermal conducting ring in the heat station means of the bayonet connector 21. The flexible section 127 of the $LN_2$ bypass makes it easy to disengage bayonets 125 and 126 as well as to disengage the sections of the heat-stationed bayonet 21. The flexible section also provides compensation for misalignment and/or slight offset of the mating portions of bayonet 21.

In evaluation tests of the bayonet connector of this invention using $LN_2$ cooling and liquid helium as the cryogenic liquid being transferred in the process line, it was determined that one of the bayonets experienced a unit heat leak of 0.1 watt, illustrating the attainment of the objects of this invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim:

1. In a heat-stationed bayonet connector suitable for joining cryogenic fluid transfer lines including male and female sections engageable to form a continuous cryogenic liquid process line with a radiation shielding means therearound for shielding radiation therefrom, the improvement comprising: a support means for supporting the connector outside the radiation shielding means; a heat station means for intercepting heat flow, said heat station means being positioned on said radiation shielding means and bonded thereto; a first tubular means located between and concentric with said process line and said radiation shielding means for interconnecting said process line and said radiation shielding means, a first end of said first tubular means being attached to said heat station and a second end thereof being attached to said process line at a position offset from said heat station along said process line; and a second tubular means located outside and concentric with said radiation shielding means for interconnecting said radiation shielding means to said support means, a first end of said second tubular means being attached to said heat station and a second end thereof being adapted for attaching to said support means, at a position offset from said heat station along said process line, whereby when said radiation shielding means are cooled said heat station means is cooled to intercept heat flow from said support means to said process line.

2. A heat-stationed bayonet in accordance with claim 1 wherein said heat station means comprises a first annular heat station in said female section intermediate its length and a second annular heat station in said male section intermediate its length.

3. A heat-stationed bayonet in accordance with claim 2 including a compressible thermal conducting ring between said first and second heat stations providing thermal engagement of said first and second annular heat stations.

4. A heat-stationed bayonet in accordance with claim 1 including means to cool said radiation shielding means.

5. A heat-stationed bayonet in accordance with claim 4 wherein said means to cool said radiation shielding means comprises tubing means bonded to said radiation shielding means and being suitable for circulation of a cryogenic coolant therethrough.

6. A heat-stationed bayonet in accordance with claim 4 wherein said means to cool said radiation shielding means comprises a first cryogenic coolant transfer line bonded to said female section and a second cryogenic coolant transfer line bonded to said male section and bypass means connecting said first and second coolant transfer lines.

7. A heat-stationed bayonet in accordance with claim 6 wherein said bypass means comprises in combination, first and second bayonet connector means having coolant process line means and vacuum jacketing means and being joined through a flexible section formed of inner bellows means coupled to said coolant line means, outer bellows means coupled to said vacuum jacketing means and insulation means interposed between said inner and outer bellows means.

8. A heat-stationed bayonet connector suitable for joining sections of a cryogenic fluid transfer line, comprising in combination a. a female section comprising
1. a mating flange defining a female mating surface,
2. a first extension tube affixed at one end to and extending from said female mating flange,
3. a first annular heat station affixed to the other end of said first extension tube, and bonded thereto,
4. a first radiation shield bonded to said heat station,
5. a second extension tube affixed at one end to said first heat station, extending from it within said first radiation shield and defining therewith a first annular evacuatable spacing, said second tube terminating in a mating seat having affixed thereto a short length of a process line tubing; and b. a male section comprising
1. a mating flange having a male mating surface engageable with said female mating surface,
2. a third extension tube affixed at one end to said male mating surface, extending therefrom and sized to define when engaged with said female section a first narrow annular spacing with the internal wall of said first entension tube of said female section,
3. a second annular heat station terminating said third extension tube,
4. a second radiation shield bonded to said second heat station, extending therefrom through said male mating flange and defining with the internal wall of said third extension tube a second annular evacuatable spacing,
5. a fourth extension tube affixed to said second heat station, extending therefrom and sized to define when engaged with said female section a second narrow annular spacing with the internal wall of said second extension tube,
5. a nose piece terminating said fourth extension tube and having a sealing ring sized to make a liquid-tight seal within said mating seat, and
7. a cryogenic fluid process line extending from said nose piece to beyond the end of said second radiation shield and defining with the internal walls of said second radiation shield and said fourth extension tube a third annular evacuatable spacing.

9. A bayonet connector in accordance with claim 8 including clamp means to ensure engagement of said male and female mating surfaces.

10. A bayonet connector in accordance with claim 8 including a compressible thermal conducting ring providing a thermal connection between said first and second annular heat stations when said male and female sections are engaged.

11. A heat-stationed bayonet in accordance with claim 8 including means to cool at least one of said radiation shields.

12. A heat-stationed bayonet in accordance with claim 11 wherein said means to cool at least one of said radiation shields comprises tubing means bonded to at least one of said radiation shields and being suitable for circulation of a cryogenic coolant therethrough.

13. A heat-stationed bayonet in accordance with claim 11 wherein said means to cool at least one of said radiation shields comprises a first cryogenic coolant transfer line bonded to said first radiation shield of said female section and a second cryogenic coolant transfer line bonded to said second radiation shield of said male section and bypass means connecting said first and second coolant transfer lines.

14. A heat-stationed bayonet in accordance with claim 13 wherein said bypass means comprises in combination, first and second bayonet connector means having coolant process line means and vacuum jacketing means and being joined through a flexible section formed of inner bellows means coupled to said coolant line means, outer bellows means coupled to said vacuum jacketing means and insulation means interposed between said inner and outer bellows means.

15. A heat-stationed bayonet in accordance with claim 8 wherein said second radiation shield has fluid ports thereby to connect said second and third evacuatable spacings.

16. A heat-stationed bayonet in accordance with claim 8 including multilayer insulation within said first, second and third evacuatable spacings.

17. A heat-stationed bayonet connector suitable for joining sections of a cryogen fluid transfer line, comprising in combination
a. male and female sections engageable to form a continuous fluid helium process line;
b. a first annular heat station in said female section intermediate its length;
c. a second annular heat station in said male section intermediate its length;
d. a first radiation shield thermally bonded to said first annular heat station;
e. a second radiation shield thermally bonded to said second annular heat station.

18. A heat-stationed bayonet in accordance with claim 17 including a compressible thermal conducting ring between said first and second heat stations providing thermal engagement thereof.

19. A heat-stationed bayonet in accordance with claim 17 including means to cool at least one of said radiation shields.

20. A heat-stationed bayonet in accordance with claim 19 wherein said means to cool at least one of said radiation shields comprises tubing means bonded to at least one of said radiation shields and being suitable for circulation of a cryogenic coolant therethrough.

21. A heat-stationed bayonet in accordance with claim 19 wherein said means to cool at least one of said radiation shields comprises a first cryogenic coolant transfer line bonded to said female section and a second cryogenic coolant transfer line bonded to said male section.

22. A heat-stationed bayonet in accordance with claim 21 including bypass means connecting said first and second coolant transfer lines.

23. A heat-stationed bayonet in accordance with claim 21 wherein said bypass means comprises in combination, first and second bayonet connector means having coolant process line means and vacuum jacketing means and being joined through a flexible section formed of inner bellows means coupled to said coolant line means, outer bellows means coupled to said vacuum jacketing means and insulation means interposed between said inner and outer bellows means.

* * * * *